United States Patent [19]

Tominaga et al.

[11] Patent Number: 4,586,800

[45] Date of Patent: May 6, 1986

[54] DATA READING DEVICE FOR AUTOMATICALLY READING FILM CARTRIDGE DATA

[75] Inventors: Shinji Tominaga, Osaka; Masaaki Nakai, Kawachinagano; Norihiro Inoue, Nara; Akihiko Fujino, Sakai; Manabu Inoue, Kobe; Nobuyuki Taniguchi, Tondabayashi, all of Japan

[73] Assignee: Minolta Camera Kabushiki Kaisha, Osaka, Japan

[21] Appl. No.: 720,296

[22] Filed: Apr. 5, 1985

[30] Foreign Application Priority Data

Apr. 6, 1984 [JP] Japan .................................. 59-69833

[51] Int. Cl.$^4$ .............................................. G03B 7/24
[52] U.S. Cl. ..................................................... 354/21
[58] Field of Search ......................... 354/21, 412, 442; 352/78 C

[56] References Cited

U.S. PATENT DOCUMENTS

| | | | |
|---|---|---|---|
| 4,024,557 | 5/1977 | Aoyama et al. | 354/275 |
| 4,074,286 | 2/1978 | Suzuki | 354/21 |
| 4,103,307 | 7/1978 | Shinoda et al. | 354/442 X |
| 4,103,308 | 7/1978 | Sakurada et al. | 354/23 D |
| 4,200,371 | 4/1980 | Suzuki et al. | 354/21 |
| 4,297,012 | 10/1981 | Nakai | 354/412 |
| 4,431,283 | 2/1984 | Hoda et al. | 354/21 |

Primary Examiner—William B. Perkey
Attorney, Agent, or Firm—Watson Cole Grindle & Watson

[57] ABSTRACT

A data reading device for a camera can provide a data being accurate with high probability through repeated data reading of a code pattern on a film cartridge even in hard conditions, such as a condition where contact between contact terminals of the device and code regions of the code pattern is unstable and a condition where the resistance value of a conductive code region is comparatively high or varies with the area on which the corresponding contact terminal abuts. In one operation example of an embodiment, the device discriminates consistency and inconsistency between the contents of the successively read data bit by bit and substitutes the contents of the later read data discriminated as being inconsistent for those of the previously read data only when the inconsistency discriminated contents of the later read data indicate conduction of the corresponding code regions. The previously read data is thus renewed again and again so as to more accurately correspond to the data indicated by the code regions of the code pattern.

19 Claims, 10 Drawing Figures

FIG.2

PRIOR ART

| ISO SPEED | Sv | 1B | 2B | 3B | 4B | 5B | 6B |
|---|---|---|---|---|---|---|---|
| 25 | 3 | ▨ |  |  |  | ▨ | ▨ |
| 32 | 3⅓ | ▨ |  |  |  |  | ▨ |
| 40 | 3⅔ | ▨ |  |  |  | ▨ |  |
| 50 | 4 | ▨ | ▨ |  |  |  |  |
| 64 | 4⅓ | ▨ | ▨ |  |  |  | ▨ |
| 80 | 4⅔ | ▨ | ▨ |  |  | ▨ |  |
| 100 | 5 | ▨ |  | ▨ |  | ▨ |  |
| 125 | 5⅓ | ▨ |  | ▨ |  |  | ▨ |
| 160 | 5⅔ | ▨ |  | ▨ |  | ▨ |  |
| 200 | 6 | ▨ | ▨ | ▨ |  | ▨ |  |
| 250 | 6⅓ | ▨ | ▨ | ▨ |  |  | ▨ |
| 320 | 6⅔ | ▨ | ▨ | ▨ |  | ▨ | ▨ |
| 400 | 7 | ▨ |  |  | ▨ | ▨ |  |
| 500 | 7⅓ | ▨ |  |  | ▨ |  | ▨ |
| 640 | 7⅔ | ▨ |  |  | ▨ | ▨ |  |
| 800 | 8 | ▨ | ▨ |  | ▨ |  |  |
| 1000 | 8⅓ | ▨ | ▨ |  | ▨ |  | ▨ |
| 1250 | 8⅔ | ▨ | ▨ |  | ▨ | ▨ |  |
| 1600 | 9 | ▨ |  | ▨ | ▨ |  |  |
| 2000 | 9⅓ | ▨ |  | ▨ | ▨ |  | ▨ |
| 2500 | 9⅔ | ▨ |  | ▨ | ▨ | ▨ |  |
| 3200 | 10 | ▨ | ▨ | ▨ | ▨ |  |  |
| weight |  | 1 | 2 | 4 | ⅓ | ⅔ |  | number of exposure frames

| | 8B | 9B | 10B |
|---|---|---|---|
| 12 | ▨ |  |  |
| 20 |  | ▨ |  |
| 24 | ▨ | ▨ |  |
| 36 |  |  | ▨ |
| — | ▨ |  | ▨ |
| — |  | ▨ | ▨ |
| 72 | ▨ | ▨ | ▨ | exposure range

| | 11B | 12B |
|---|---|---|
| ±½ |  |  |
| ±1 | ▨ |  |
| +2,−1 |  | ▨ |
| +3,−1 | ▨ | ▨ |

DATA READING DEVICE FOR AUTOMATICALLY READING FILM CARTRIDGE DATA

FIELD OF THE INVENTION

The present invention relates to a data reading device which automatically reads the data indicated on a film cartridge by a code pattern formed in order to indicate the characteristic of a film accommodated in said film cartridge.

BACKGROUND OF THE INVENTION

A film cartridge A prior art is shown in FIG. 1 and at the side surface of film cartridge A is formed a code pattern B indicating sensitivity of the film accommodated, the number of frames of film and exposure range data indicating the allowable range of exposure which assures adequate exposure. As shown in FIG. 2, this code pattern always provides the electrically conductive portion in the area 1B which forms a common electrode portion. The areas 2B–6B, 8B–10B and 11B, 12B are code regions and made electrically conductive or non-conductive in accordance with sensitivity of the film, the number of frames of film and exposure range data, respectively. In FIG. 2, the hatched regions indicate the conductive portions, while the white regions indicate the non-conductive portions.

A camera loaded with such a film cartridge is capable, as is disclosed, for example, in the U.S. Pat. No. 4,431,283, of automatically reading data indicated by the code pattern on the film cartridge by providing a data reading device in such a structure as explained below. Namely, a plurality of contact terminals are provided within a film accommodating chamber in such a way that these terminals are in contact with respective bits of the code pattern on the film cartridge. It is determined whether each code region of 2B–6B, 8B–12B is set to the ground potential or the power source potential with the region 1B being grounded or connected to the power source. For example, if region 2B is set to the ground or power source potential, it is the conductive area being conductive with the region 1B. The result of such determination of each region is read as digital data. When a data reading device with such a structure is provided, it is no longer necessary to set the sensitivity of film manually and automatic operation of the camera can further be improved remarkably.

However, in such a film cartridge A as proposed above, there may arise a problem that the resistance value of a conductive portion of the code pattern is comparatively large and moreover the resistance value is different in accordance with the contact area of the contact terminal even in one conductive area of the code pattern. Therefore, the data reading device of the structure mentioned above has a disadvantage that in case the film cartridge is pressed to the contact terminal by the rear cover of the camera, when the rear cover is pushed by the fingers of an operator, the contact area of contact terminals on each code pattern changes minutely. This may result in the change in the result of the aforementioned determination, in other words, the read data, in accordance with the timing of reading data, namely the timing of determining conductive or non-conductive conditions of the pattern, and thereby the data may be misread. In addition, if a large amplitude vibration is given to the camera, where the film cartridge is pressed to the contact terminal by the rear camera cover or by other means, the contact terminals may separate from the code pattern, causing misreading of the data in accordance with the timing of the reading.

SUMMARY OF THE INVENTION

It is accordingly an object of the present invention to provide a data reading device for a camera which is capable of reading the data indicated by the code pattern on a film cartridge with high probability of being accurate, even under the conditions as described above.

Another object of the present invention is to provide a data reading device for a camera which is capable of obviating mis-reading of the data indicated by the code pattern on a film cartridge even where the film cartridge is wet at the code regions of the code pattern.

According to a data reading device of the present invention, it is determined whether predetermined code regions of the code pattern are conductive or nonconductive with the common region and the determination result is read for plural times at different moments so that plural data are produced in accordance with the determination results at the different moments. Data being accurate with high probability, i.e., a data accurately corresponding to the data indicated by the code pattern with high probability, is produced based on the plural data. As the conditions as described above will probably cease at one or more of the different moments for the reading operations, one or more of the plural data produced may be relied upon as the basis for producing the data being accurate with a high probability.

In case the film cartridge is wet at the code regions of the code pattern, there will occur a problem that the nonconductive regions of the code pattern are erroneously determined as being conductive code regions due to a decrease in the resistance values. According to a data reading device of the present invention, a comparatively large current is applied to the code regions before start of the reading operation for the purpose of increasing the resistance values of the nonconductive code regions.

The above and other objects and advantages of the present invention will become more apparent from the following description of preferred embodiments taken in conjunction with the accompanying drawings.

BRIEF DESCRIPTION OF THE DRAWINGS

FIG. 2 is a code pattern provided on the film cartridge;

DESCRIPTION OF THE PREFERRED EMBODIMENTS

Figure 3:
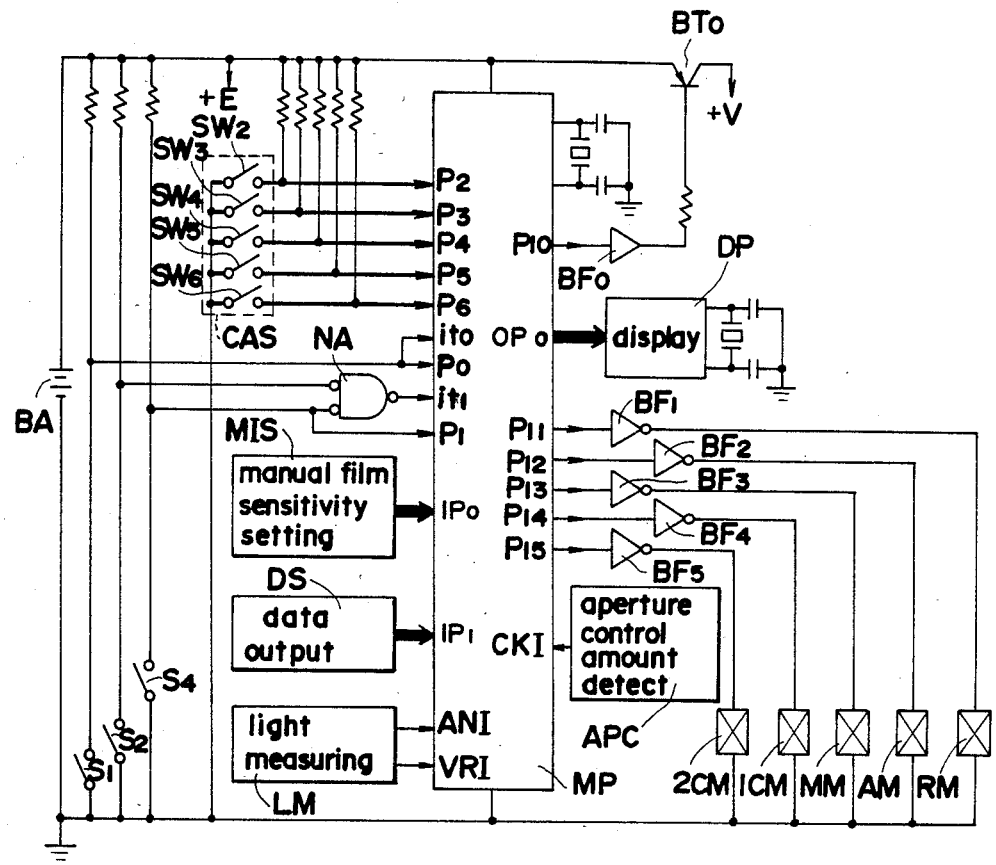
FIG. 3 is circuit diagram showing the entire part of an embodiment to which the present invention is applied.

With reference to FIG. 3, the thick line represents a signal line for plural bits. BA is a power supply battery. The power is directly supplied to a manual film sensitivity setting means MIS, a data output means DS which outputs data for exposure control other than the film sensitivity (exposure control mode, set f-number, set shutter speed, minimum aperture value, fully open aperture value), a display means DP, a NAND circuit NA, a buffer $BF_0$ and a microcomputer MP through a power supply line $+E$. A switch $S_1$ is a light measurement switch which is closed when the release button (not shown) is depressed to the first stage. When this switch $S_1$ is closed, an interrupt terminal $it_0$ of the microcomputer MP is "LOW", triggering interruption to the microcomputer MP which in turn starts an exposure calculating operation. A switch $S_2$ is a release switch which is closed when the release button is depressed to the second stage. A switch $S_4$ is a reset switch which is closed when cocking of an exposure control mechanism (not shown) is completed and opened when exposure control operation terminates. When the release switch $S_2$ is closed under the condition that the reset switch $S_4$ has been closed and that the microcomputer MP has terminated calculation of an exposure control value to be ready to accept an interrupt signal from another interrupt terminal $it_1$ of the microcomputer MP at any desired time, the output of NAND circuit NA is "LOW" and this "LOW" output is fed to the interrupt terminal $it_1$ of the microcomputer MP, which in turn starts exposure control operation.

Figure 4:
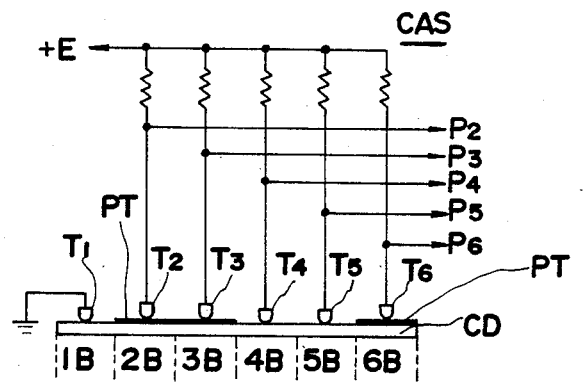
FIG. 4 shows an example of practical structure of switch read circuit CAS shown in FIG. 3.

A switch read circuit CAS surrounded by a broken line and shown in detail in FIG. 4 reads film sensitivity data represented by the code regions 2B-6B on the film cartridge. The switch read circuit CAS consists of switches $SW_2-SW_6$ which correspond to terminals $T_1$ and $T_2$, $T_1$ and $T_3$, $T_1$ and $T_4$, $T_1$ and $T_5$ and $T_1$ and $T_6$, respectively of FIG. 4. In FIG. 4, the film cartridge is provided with an electrically conductive plate CD on which the regions 1B-6B are formed. The code regions 4B and 5B as well as the common region 1B are directly formed on the conductive plate CD while the code regions 2B, 3B and 6B are formed on the conductive plate CD by being covered by electrically insulative paint PT.

The code pattern represented by the code regions 2B-6B corresponds to ISO400 as shown in FIG. 2. The terminal $T_1$ is grounded while the terminals $T_2-T_6$ are connected to the power supply line $+E$ through pull-up resistors. In this example, a signal "LOW" is input to the respective terminals $P_4$, $P_5$ of the microcomputer MP because the code regions 4B and 5B are conductive with the common region 1B, while a signal "High" is input to the respective terminals $P_2$, $P_3$, $P_6$ of the microcomputer because the code regions 2B, 3B and 6B are non-conductive with the common region 1B, whereby the microcomputer determines that the code pattern is "00110" as a digital word.

The manual film sensitivity setting means MIS which outputs manually set film sensitivity data is constituted by a digital encoder of the gray code type. This data is read by the microcomputer through an input port $iP_0$ and employed for the exposure calculation when the film cartridge loaded in the cartridge chamber is of the type without the code pattern. To this end, the microcomputer can determine whether the film cartridge loaded in the film cartridge chamber is of the type with the code pattern or of the type without the code pattern, based on the data input from the switch read circuit CAS. For example, the signal "LOW" is not input to any terminals of $P_5$ and $P_6$ where the cartridge is of the type without the code pattern. The data output means DS outputs various exposure control data as described above and the microcomputer MP also reads the various exposure control data through another input port $IP_1$ for the exposure calculation. The display means DP is constituted by a liquid crystal and displays various data such as the exposure time, the aperture value, the exposure control mode and the automatically read or manually set film sensitivity, etc.

A transistor $BT_0$ is a power supply transistor for supplying power to a power supply line $+V$. This transistor becomes conductive through the buffer $BF_0$ when the light measurement switch $S_1$ is closed and the terminal $P_{10}$ of microcomputer MP is set to the "LOW" level. A light measuring circuit LM receives the power from the power supply line $+V$. An output of this circuit LM is input to an analog input terminal ANI of an A-D converter in the microcomputer MP, and a reference voltage generated from a reference voltage generator included in the light measuring circuit LM is also input to a reference voltage input terminal VRI of a D-A converting part of the A-D converter. RM is a diaphragm release magnet which, when energized, starts a diaphragm stopping-down operation. AM is an aperture stop magnet which, when energized, stops the diaphragm stopping-down operation. MM is a mirror-up magnet which, when energized, causes a reflection mirror for a single-lens refelx camera to start to move upward. 1CM is a shutter front curtain release magnet which, when energized, allows a shutter front curtain to start running. 2CM is a shutter rear curtain release magnet which, when energized, allows a shutter rear curtain to start running. Buffers $BF_1-BF_5$ which drive these respective magnets receive the power from the power supply line $+V$. An aperture control amount detector APC receives power from the power supply line $+V$ and outputs clock pulses, the number of which corresponds to the amount of the movement of a diaphragm control member (not shown) when the diaphragm aperture is stopped-down. These pulses are sent to an internal event counter of the microcomputer MP through a clock input terminal CKI. Data dAv, representative of the amount of stop-down of the diaphragm aperture to be controlled is preset to the event counter and this data is subtracted in response to the clock pulses. When the content of the event counter becomes "0", counter interruption takes place and the microcomputer energizes the magnet AM through the buffer $BF_2$ for stopping the diaphragm stopping-down operation.

Figure 5A:
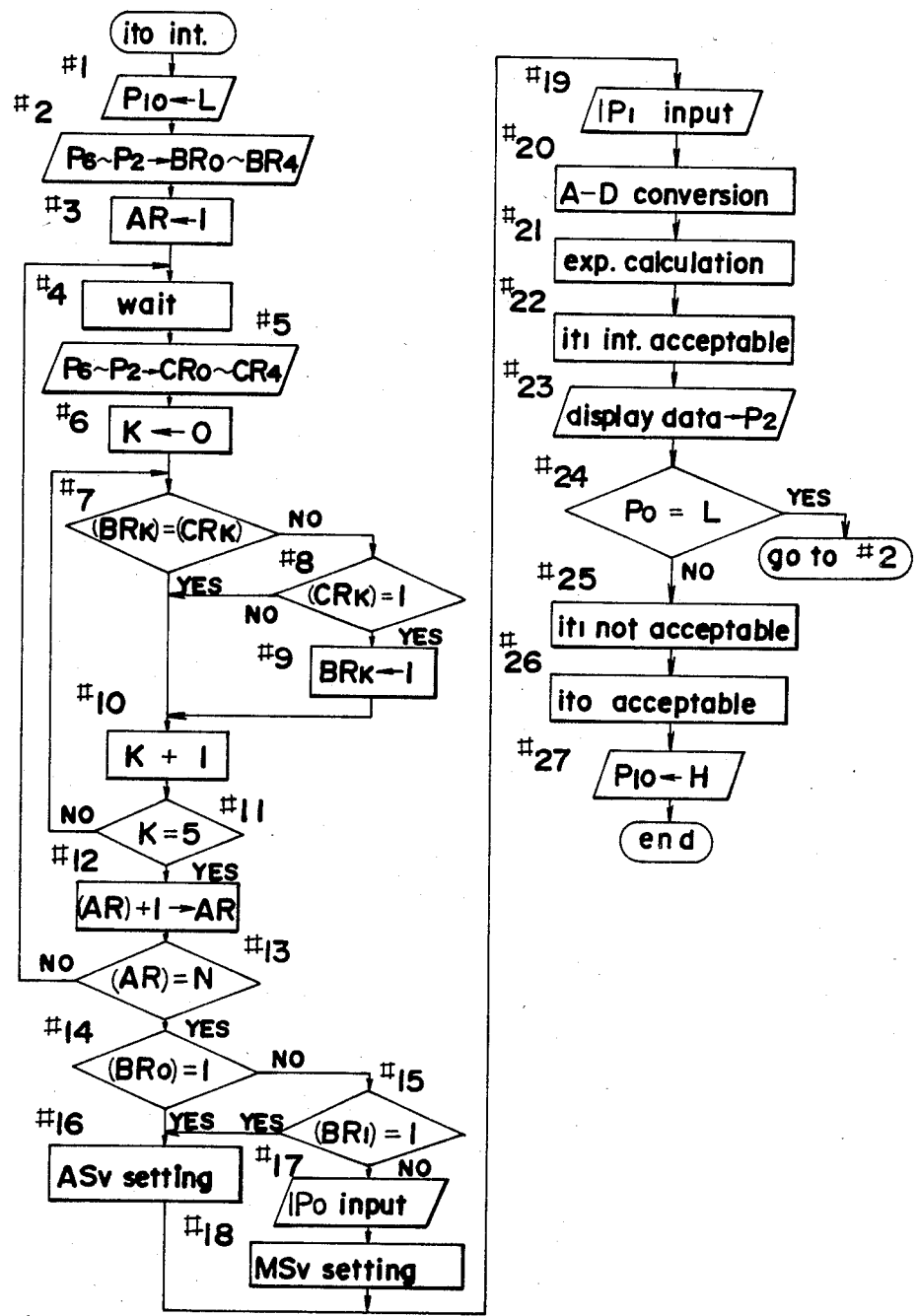
FIGS. 5a and 5b are flow charts showing an operational example of a microcomputer MP used in the embodiment of FIG. 3.

An example of operation of the microcomputer MP in the above embodiment will be explained with reference to FIGS. 5a and 5b. When the light measurement switch $S_1$ is closed and an interrupt signal "LOW" is input to the interrupt terminal $it_0$, the microcomputer MP causes the terminal $P_{10}$ to become "LOW" at the step #1 so that the transistor $BT_0$ becomes conductive, allowing the power supply line $+V$ to start the supply of power (FIG. 5a). Next, the data from the switch read circuit CAS being input to the microcomputer from the terminals $P_2-P_6$ are set to the bits $BR_4-BR_0$ of a register BR. Here, if a signal "LOW" is being generated data "1" is set, and if a signal "HIGH" is being generated, data "0" is set. Moreover, the data from terminal $P_2$ is set as bit $BR_4$, the data from $P_3$ to $BR_2$, the data from terminal $P_5$ as bit $BR_1$ and the data from terminal $P_6$ as bit $BR_0$. Then, the content of a register AR is set to "1" and the operation goes to the step #4. After lapse of a predetermined period of time, the signals being input to terminals $P_6$–$P_2$ at this moment are set to the bits $CR_0$–$CR_4$ of a register CR in the same manner as described above. At the step #6, the content of a register K is set to "0", and at the step #7, the contents of bits $BR_0$ and $CR_0$ are checked whether or not they are consistent with each other. If the contents of bits $BR_0$ and $CR_0$ are inconsistent with each other, the content of bit $CR_0$ is checked whether it is "1" or not at the step #8. When it is "1", "1"=($CR_0$) is set to the bit $BR_0$ at the step #9. Meanwhile, if the contents of bits $BR_0$ and $CR_0$ are consistent with each other at the step #7, or if the content of bit $CR_0$ is "0" at the step #8, the content of bit $BR_0$ is left unchanged and the operation moves to the step #10. This is because the probability of determining that the non-conductive code region is conductive is almost zero but the probability of determining that a conductive code region is non-conductive is comparatively high. Namely, if two data (the contents of bits $BR_0$ and $CR_0$ in the above examples) are inconsistent with each other, the data representative of the conduction of the code region is preferentially set in order to raise the probability of accurately reading the data. At the step #10, "1" is added to the content of the register k, and at the step #11, it is determined whether the content of the register k is "5" or not. If it is not "5", operation the returns to the step #7. Then comparison of the contents are carried out between bits $BR_1$ and $CR_1$, $BR_2$ and $CR_2$, $BR_3$ and $CR_3$, $BR_4$ and $CR_4$, as in the case of bits $BR_0$ and $CR_0$. After the determination for all bits is completed, the operation moves to the step #12, At the step #12 "1" is added to the content (AR) of the register AR, and at the step #13 it is determined whether content (AR) reaches the specified value N or not. If it is not N, operation returns to the step #4 an the operations explained above are carried out with the content of register CR updated for each operation. At the step #13, when the content (AR) of the register AR reaches N, data input to the terminals $P_6$–$P_2$ are read out for N times. Upon every read out of the data, the read data are set as the bits $BR_4$ to $BR_0$ of the register BR so that the data representative of the conduction of the respective code regions is preferentially set to the corresponding bits and thereby the data can be set accurately with very high probability.

When the content of register AR reaches N at the step #13, the operation moves to the step #14. At the steps #14 and #15, it is determined based on the contents ($BR_0$) and ($BR_1$) of the register BR, whether at least one of the code regions 5B and 6B is conductive or not. Since the coding is determined so that any one of these code regions 5B and 6B always becomes conductive as indicated in FIG. 2, the conduction of at least one of these code regions 5B and 6B indicates that a film cartridge having the code pattern is loaded and therefore the data read out to the register BR is converted to the film sensitivity data Sv(ASv) at the step #16 for calculation and display. Meanwhile, when it is determined that both code regions 5B and 6B are non-conductive in the steps #14 and #15, it means that a film cartridge not provided with the code pattern is loaded, or a film cartridge is not loaded. In this case, a manually set film sensitivity data from the manual film sensitivity setting means MIS is read from the input port $IP_0$ at the step #17 and this data is converted to the film sensitivity data Sv (MSv) at the step #18 for calculation and display.

When the film sensitivity Sv has been set automatically or manually as explained above, the various exposure control data from the data output means DS are read from the input port $IP_1$ at the step #19 and an output of the light measuring circuit LM is converted to a digital signal at the step #20. With the above operations, all data required for exposure calculation are read, and exposure calculation is carried out at the step #21. Upon completion of this calculation, the operation is ready to move to the exposure control operation, so that the microcomputer allows the interrupt terminal $it_1$ to accept an interrupt signal at the step #22 and sends the display data to the display means DP through the output port $OP_0$. At the step #24, it is determined based on the signal input to the input terminal $P_0$, whether the light measurement switch $S_1$ is closed or not. In this connection, a signal "LOW" is being input with the light measurement switch $S_1$, closed. When the light measurement switch $S_1$ is closed, the operation moves to the step #2 and all the operations as explained above are carried out again. On the other hand, when it is determined at the step #24 that the light measurement switch $S_1$ is not closed, the microcomputer inhibits the terminal $it_1$ from accepting an interrupt signal at the step #25 while allowing the terminal $it_0$ to accept an interrupt signal at the step #26, and sets the terminal $P_{10}$ to the level "HIGH" at the step #27, turning OFF the transistor $BT_0$. Thereby, the supply of power is suspended and the operations stop.

Figure 5B:
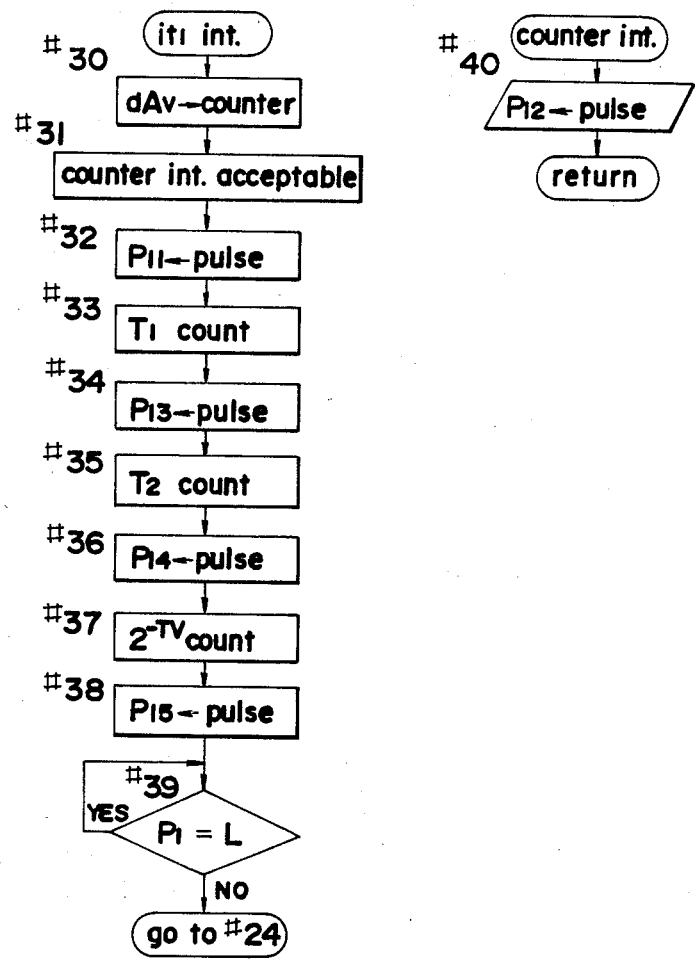

When the release switch $S_2$ closed under the condition that an interrupt signal to the terminal $it_1$ is acceptable, the microcomputer MP starts the operation from the step #30 (FIG. 5b). The data dAv for the diaphragm control is preset to the event counter at the step #30 and the counter interrupt becomes acceptable at the step #31. Then a "LOW" level pulse is output to the terminal $P_{11}$ energizing the release magnet RM at the step #32. Thereby, the diaphragm stopping-down operation starts and the content of the event counter is subtracted by the clock pulses generated by the aperture control amount detector APC. On the other hand, the microcomputer MP starts counting a predetermined period of time $T_1$ at the step #33, and outputs a pulse of "LOW" level to the terminal $P_{13}$ after the lapse of time $T_1$ at the step #34 for energizing the mirror magnet MM so that upward movement of the mirror starts. Then the microcomputer starts counting a predetermined period of time $T_2$ at the step #35. The period ($T_1+T_2$) is long enough for the diaphragm stop-down from the fully open aperture to the minimum aperture. During this period the content of the event counter becomes "0" and a count interrupt takes place. When this takes place, the microcomputer outputs a pulse of "LOW" level to the terminal $P_{12}$ at the step #40, thereby energizing the aperture magnet AM for stopping the diaphragm stopping-down operation. In this case the operation returns to the main flow of FIG. 5a. During the period $T_2$, upward movement of the mirror terminates. The microcomputer outputs a pulse of "LOW" level to the terminal $P_{14}$ at the step #36, thereby energizing the shutter front curtain release magnet 1CM for allowing the shutter front curtain to start running, while at the step #37, the microcomputer starts counting the period of time $2^{-Tv}$ determined by the exposure time data Tv. When the counting for this period terminates, the microcomputer outputs a pulse of "LOW" level to the terminal $P_{15}$ at the step #38, thereby energizing the shutter rear curtain release magnet (2CM) for allowing the shutter rear curtain to start running. When the running of the shutter rear curtain terminates, the mirror moves downward, the diaphragm is reset to the fully open aperture, and the reset switch $S_4$ is opened. In response to the opening of this switch $S_4$, the terminal $P_1$ becomes "HIGH," the exposure control operation terminates and the microcomputer MP starts the operation from the step #24 again.

Figure 1:
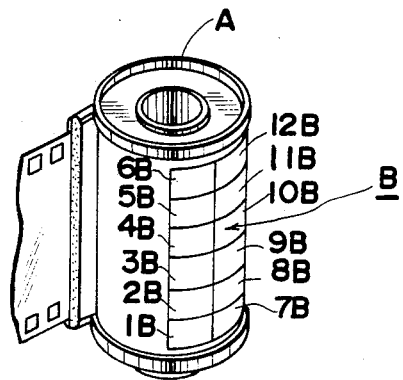
FIG. 1 is a perspective view of a prior art film cartridge A.
Figure 6:
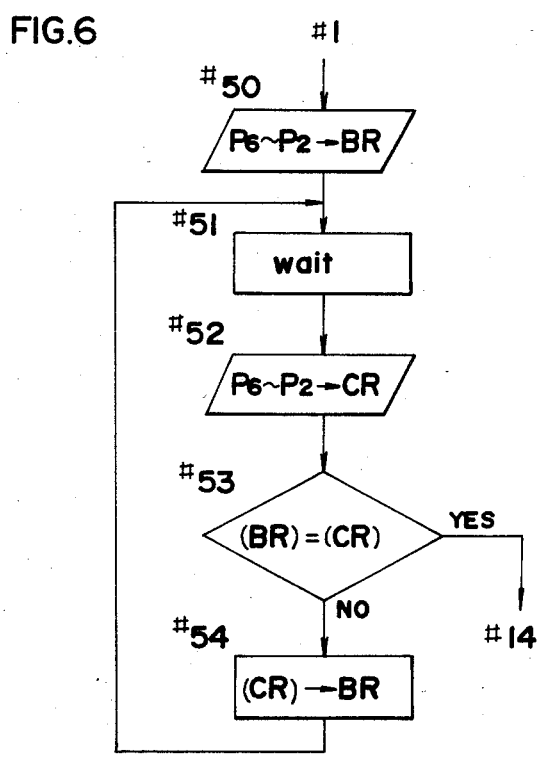
FIGS. 6 and 7 respectively are flow charts showing other operational examples of the microcomputer MP used in the embodiment of FIG. 3.

In FIG. 6 showing the second operational example of microcomputer MP in the above embodiment, the steps #2–#13 of FIG. 5a are replaced with the steps #50–54. At the step #50, the data sent from the terminals $P_6$–$P_2$ are readout to the register BR as in the case of step #2. After a certain period of waiting at the step #51, the data sent from the terminals $P_6$–$P_2$ are readout to the resister CR at the step #52. It is then determined at the step #53 whether or not the bit contents (BR) and (CR) of registers BR and CR are consistent with each other. When these bit contents are consistent with each other, the operation moves to the step #14, but when these bit contents are inconsistent, the bit content (CR) of register CR is set as (BR) at the step #54, and the operation returns to the step #51. Accordingly, in this operational example, when the two data readout at the times before and after a certain period are consistent with each other, it is regarded that the data have been read accurately. This is a result of placing the focus on the fact that mis-detection may most possibly occur when contact between the terminals $T_1$–$T_6$ and the code pattern of the film cartridge is not stable. Namely, error signals will not be output stably, and the consistency between the two data readout at the times before and after a certain period will indicate that contact between the terminals and the code pattern is stable.

Figure 7:
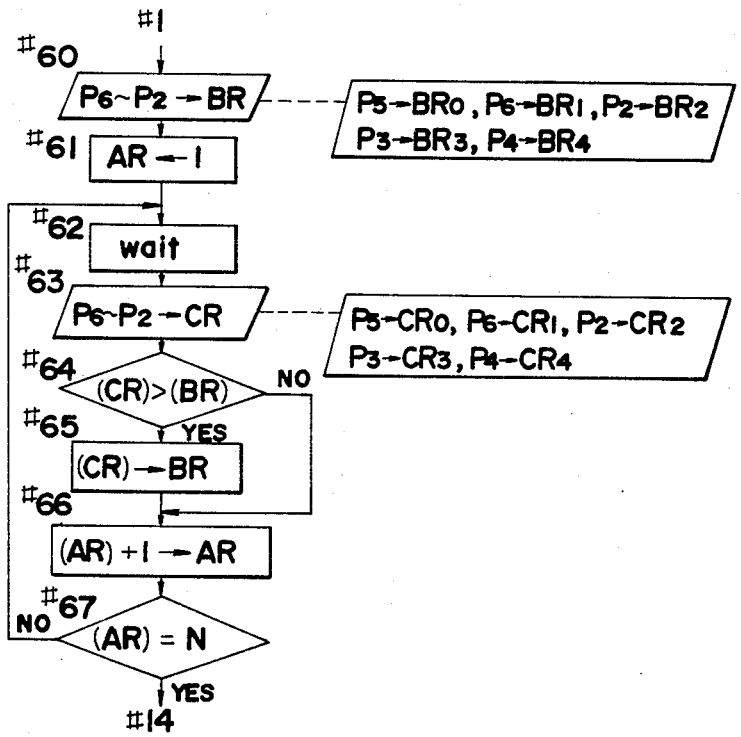

In FIG. 7 showing a third operational example of the microcomputer MP in the above embodiment, the steps #2–#13 in FIG. 5a are replaced with the steps #60–#67. At the step #60, the data from the terminal $P_5$ is set to bit $BR_0$, the data from $P_6$ to $BR_1$, the data from $P_2$ to $BR_2$, the data from terminal $P_3$ to $BR_3$, and the data from $P_4$ to $BR_4$, respectively. As shown in FIG. 2, the region 4B has the weight of "4" in terms of an APEX value, while the region 3B has the weight of "2", the region 2B of "1", the region 6B of "⅔", and the region 5B of "⅓". Therefore, the bit of the code having heavier weight is set to the more significant bit of the register BR. At step #61, "1" is set in the register AR, and the operation is queued for a certain period at the step #62. At the step #63, the data sent from the terminals $P_6$–$P_2$ are set in the register CR in the same way as at the step #60. At the step #64 it is determined whether or not the content (CR) of the register CR is larger than the content (BR) of the register BR. When the content (CR) is larger than the content (BR), (CR) is set to the register BR at the step #65. When content (CR) is not larger than the content (BR), (BR) is left unchanged and the operation moves to the step #66. "1" is added to the content (AR) of the register AR at the step #66, and it is determined at the step #67 whether the content of the register has reached N or not. If it has not reached N, the operation returns to the step #62 and the operation which is the same as that explained above is carried out. When the content of the register AR has reached N, the operation moves to the step #14.

In the third operational example, the maximum value of N data read out is taken out. Since the data is larger when a code region of the film cartridge is conductive than when it is nonconductive, conduction of each code region is read preferentially as in the case of the first operational example.

Figure 8:
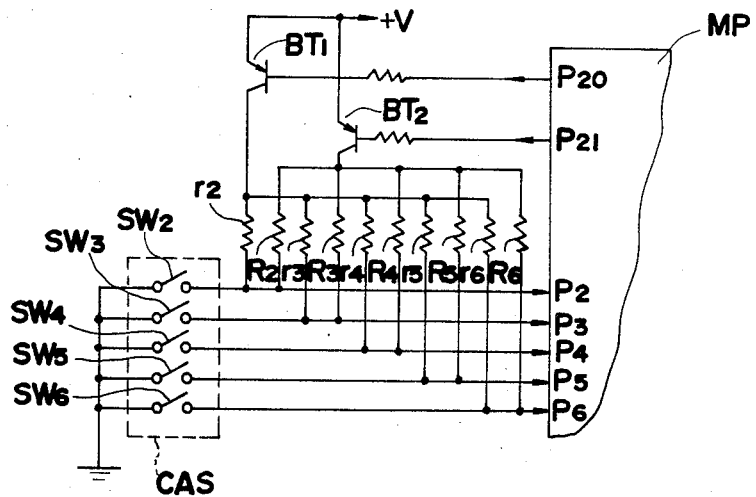
FIG. 8 is a circuit diagram showing an essential portion of another embodiment to which the present invention is applied.
Figure 9:
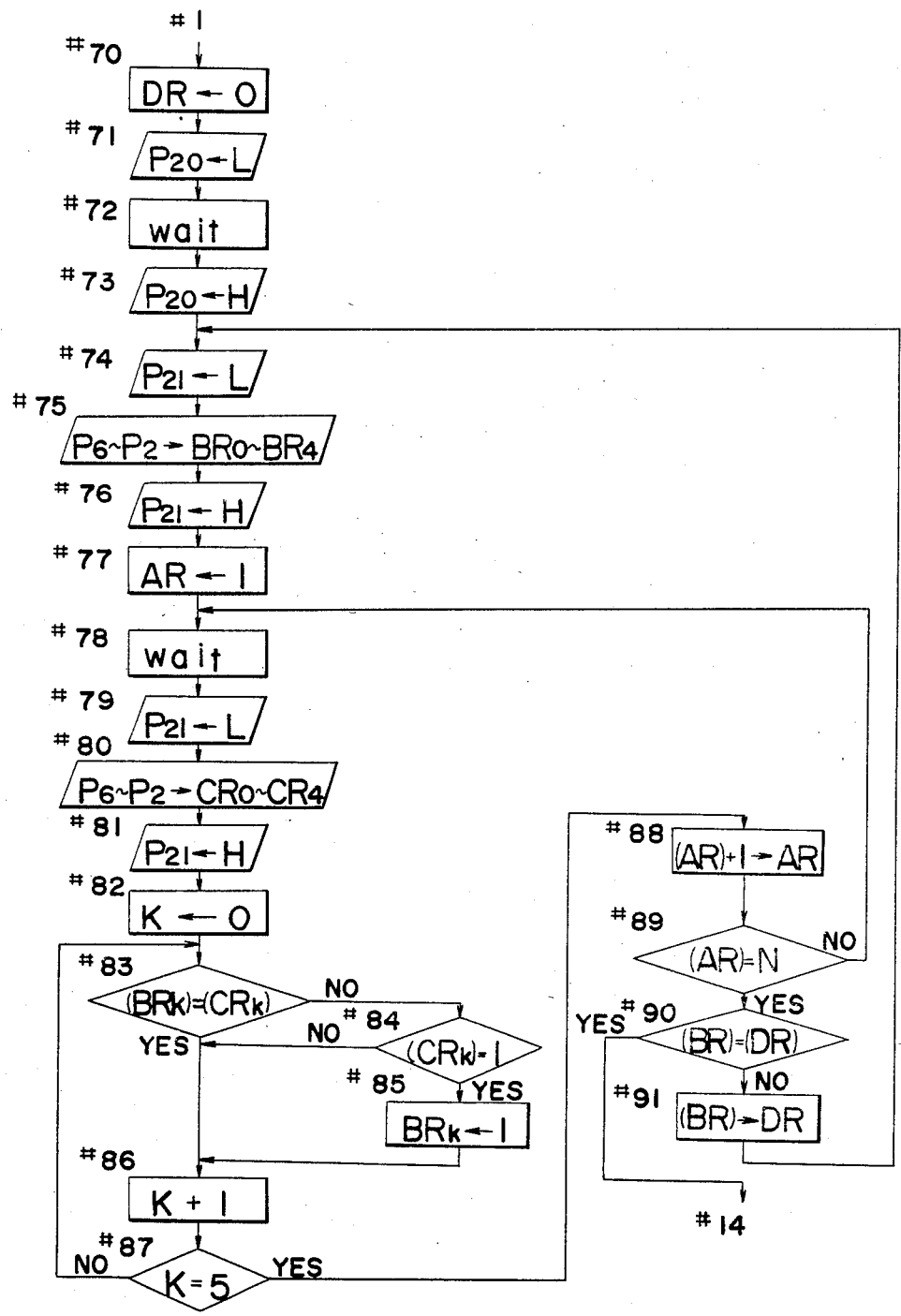
FIG. 9 is a flow chart showing operational example of a micro-computer used in the embodiment of FIG. 8.

FIG. 8 shows an essential part of the circuit of another embodiment of the present invention which is different from the circuit structure shown in FIG. 3. In FIG. 8, the resistance values of the pull-up resistors are in the following relation $r_2 = r_3 = r_4 = r_5 = r_6 < R_2 = R_3 = R_4 = R_5 = R_6$. FIG. 9 shows operational examples of the microcomputer MP to be substituted for the steps #2–#13 in FIG. 5.

At the step #70 the content of a register DR is set to "0". Then at the step #71 the microcomputer outputs a signal "LOW" to terminal $P_{20}$ for a certain period, so that the transistor $BT_1$ becomes conductive for the certain period. By the conduction of the transistor $BT_1$ a current which is larger than that flowing through the resistors $R_2$–$R_6$ when the transistor $BT_2$ becomes conductive flows through resistors $r_2$–$r_6$ for the certain period. In general, if a current is continuously applied to a wet insulator, the resistance value of the insulator gradually increases and the current value is lowered correspondingly. Therefore, even where the film cartridge is wet from water or perspiration, the resistance values of the nonconductive code regions of the code pattern increase if the large current is applied to the code pattern through the resistors $r_1$–$r_6$ for the certain period before reading the code pattern. This prevents the switch read circuit CAS from erroneously determining the nonconductive code regions as conductive code regions and thereby the code pattern can be read accurately and reliably.

After the certain period of waiting at the step #62, the microcomputer sets the terminal $P_{21}$ to a "LOW" level at the step #74, so that the transistor $BT_2$ becomes conductive instead of the transistor $BT_1$, applying a smaller current to the resistors $R_2$–$R_6$. At the step #75 the data from the switch read circuit CAS being input to the terminals $P_6$–$P_2$ are set to the bits $BR_0$–$BR_4$ of register BR. At the step #76 the microcomputer sets the terminal $P_{21}$ to "HIGH", so that the transistor $BT_2$ becomes non-conductive. Next, at the step #77 "1" is set in the register AR. After a certain period of waiting at the step #78, the microcomputer sets the terminal $P_{21}$ to "LOW" again at the step #79, and the data sent from the switch read circuit CAS are set to registers $CR_0$–$CR_4$ at the step #80. When this completed, the microcomputer sets the terminal $P_{21}$ to "HIGH" again at the step #81, and the operation moves to the step #82. Up to the step #87, the conduction of each code region is taken out preferentially as in the steps #6–#11 of the first operational example explained above, and data thus read are set as the respective bits of the register BR. "1" is added to the content (AR) of the register AR at the step #88, and it is determined at the step #89 whether the content of register AR has reached N. When it has not reached N, the operation returns to the step #78 and the above operation is repeated again. Meanwhile, when the content of the register AR has reached "N", it is determined at the step #90 whether or not the contents of the register BR and the register DR are consistent with each other. When they are consistent with each other, the operation moves to the step #14 on the supposition that the code pattern has been read accurately. On the other hand, if the contents of registers BR and DR are inconsistent with each other, the content of register BR is set to BR and newly read data is set again in the register BR.

As understood from the above explanation, this operation example is a combination of the operation example of FIG. 5 and the operation example of FIG. 6. Though the transistor $BT_1$ and resistors $r_2$-$r_6$ which have the larger current flow for a certain period are provided separately from the transistor $BT_2$ and resistors $R_2$-$R_6$ which have the smaller current flow, it is possible to use in common the transistor $BT_1$ and resistors $r_2$-$r_6$. Namely, in such a case, the transistor $BT_1$ is rendered conductive and the larger current is also applied through the resistors $r_2$-$r_6$ during the data reading.

In the operation examples of FIG. 5, FIG. 7 and FIG. 9, a value of N is set to about "5", for example, while, in the operational example of FIG. 6, the steps #51-190 54 are repeated until (BR)=(CR). The certain period for determining the time interval for repeatedly reading data from the code pattern in the operational examples of FIG. 5, FIG. 6, FIG. 7 and FIG. 9 is about 0.1-10 msec and the certain period for the application of the larger current to the code pattern in the operational example of FIG. 9 is, for example, about 10 msec. The significant bits $BR_7$-$BR_5$, $CR_7$-$CR_5$, $DR_7$-$DR_5$ of the registers BR, CR and DR are set to either all "0" or all "1" in each operational example.

In the above embodiments, data read from the code pattern is started when the light measurement switch $S_1$ is closed. However, the present invention can also be adopted, for example, to a camera which is provided with a switch for detecting the opening and closure of a rear cover such that the data reading is started when the rear cover is closed and such that the data read previously continues to be stored until a new data is read after the rear cover is closed again.

In addition, the camera having the structure for reading the film sensitivity data from all regions 2B-6B of the code pattern has been explained, but the present invention can also be adopted to a camera having a structure for roughly reading the film sensitivity data from only the regions 3B and 4B or the regions 2B and 3B, for example, and moreover to a camera having a structure for reading the exposure range data from the regions 11B and 12B, or the film frame number data from the regions 8B, 9B, 10B. In addition, the present invention can be adopted to cameras using a variety of data reading circuits. One example of such data reading circuits may have a structure in which the terminal $T_1$ for the common region 1B is connected to the power supply line $+E$ or $+V$ with each of the terminals $T_2$-$T_6$ for the code regions 2B-2B connected to the ground through a resistor so that the potentials appearing at the nodes between the respective terminals $T_2$-$T_6$ and the respective resistors are picked up as the signal representative of the film sensitivity. Furthermore, a microcomputer is used in each of the embodiments and the operation examples thereof are indicated by the flow chart, but an embodiment which provides a similar effect can also be realized with a digital circuit.

As explained above, a data reading device of the present invention provides data with a high probability of accuracy through a plural times data reading of the code pattern on the film cartridge. Accordingly, the data provided by the device of the present invention is highly reliable and not influenced by the timing of the data reading at all.

What is claimed is:

1. A data reading device for a camera which is adapted to be loaded with a film cartridge having a code pattern whose code regions are selectively conductive and nonconductive with a common region thereof in accordance with the film data contained in said film cartridge, said data reading device comprising:
   (a) means for determining whether predetermined regions of said code regions are conductive or nonconductive with said common region;
   (b) means for reading the determination result to produce data in accordance therewith;
   (c) means for causing said reading means to repeat the reading operation for a number of times at different moments; and
   (d) means for receiving the plurality of data produced by said reading means to produce data being accurate with high probability based thereon.

2. A data reading device as defined in claim 1, wherein said reading means is adapted to produce said data in a digital word of plural bits, the number of the bits corresponding to the number of said predetermined regions of said code regions.

3. A data reading device as defined in claim 2, wherein said data producing means includes:
   ($d_1$) first and second storage means for renewably storing said data produced by said reading means;
   ($d_2$) control means for controlling the data storage in said first and second storage means, said control means causing said first storage means to store said data produced by said reading means as first stored data from the first reading operation and causing said second storage means to store said data produced by said reading means as second stored data at the second and subsequent reading operations such that the second stored data is renewed upon each reading operation following the second reading operation;
   ($d_3$) a first discriminator for serially determining the consistency and inconsistency between said first and second stored data with respect to the corresponding bits;
   ($d_4$) a second discriminator for determining whether or not the content of each bit of said second stored data determined by said first discriminator as being inconsistent with that of the corresponding bit of said first stored data indicates the conduction of the corresponding code region with said common region;
   ($d_5$) data substituting means for substituting the content of each bit of said second stored data, determined by said second discriminator as indicating the conduction of the corresponding code region with said common region, for the content of the corresponding bit of the first stored data in said first storage means; and
   ($d_6$) means for reading out said first stored data from said first storage means as said data being accurate with a high probability.

4. A data reading device as defined in claim 3, wherein the number of the repetitions of the reading operations by said reading means is predetermined.

5. A data reading device as defined in claim 4, wherein the time interval between the successive data reading operations of said reading means is predetermined.

6. A data reading device as defined in claim 2, wherein said data producing means includes:

(d₁) first and second storage means for renewably storing said data read by said reading means;

(d₂) control means for controlling the data storage in said first and second storage means, said control means causing said first storage means to store said data produced by said reading means as first stored data at the reading operation and causing said second storage means to store said data produced by said reading means as second stored data at the second and subsequent reading operations such that the second stored data is renewed upon each reading operation following the second reading operation;

(d₃) a discriminator for determining the consistency and inconsistency between said first and second stored data with respect to all the corresponding bits thereof;

(d₄) data substituting means for substituting said second stored data for said first stored data in said first storage means when the inconsistency between said first and second stored data is determined by said discriminator; and (d₅) means for reading out said first stored data from said first storage means as said data being accurate with a high probability.

7. A data reading device as defined in claim 6, wherein said reading operation repeating means is adapted to repeat the reading operations until the consistency between said first and second stored data is determined by said discriminator.

8. A data reading device as defined in claim 7, wherein the time interval between the successive reading operations by said reading means is predetermined.

9. A data reading device as defined in claim 2, wherein said code regions of said code pattern have different respective weights, and wherein said reading means is adapted to produce a signal "1" each time the conduction of any one of said predetermined regions with said common region is determined by said discriminating means while producing a signal "0" each time the nonconduction of any one of said predetermined regions with said common region is determined by said discriminating means, said data being a combination of the signal "1" and the signal "0", and the more significant bit thereof corresponding to a heavier weighted region of said predetermined regions.

10. A data reading device as defined in claim 9, wherein said data producing means includes:

(d₁) first and second storage means for renewably storing said data read by said reading device;

(d₂) control means for controlling the data storage in said first and second storage means, said control means causing said first storage means to store said data produced by said reading means as first stored data at the first reading operation and causing said second storage means to store said data produced by said reading means as second stored data at the second subsequent reading operations such that said second stored data is renewed upon each reading operation after the second reading operation, said first and second storage means storing said data produced by said reading means in such a manner that the content of the more significant bit of the data is stored as the more significant bit of said first and second storage means;

(d₃) a discriminator for determining which of the first and second stored data is greater than the other;

(d₄) data substituting means for substituting said second stored data for said first stored data in said first storage means when it is determined that the second stored data is greater than the first stored data; and (d₅) means for reading out said first stored data from said first storage means as said data being accurate with a high probability.

11. A data reading device as defined in claim 10, wherein the number of the repetitions of the reading operations of said reading means is predetermined.

12. A data reading device as defined in claim 11, wherein the time interval between the successive reading operations of said reading means is predetermined.

13. A data reading device as defined in claim 1, further comprising:

(d) means for applying a comparatively large current to said code pattern on said film cartridge before start of the reading operations by said reading means for the purpose of increasing the resistance values of the nonconductive code regions of said code pattern even with a wet code pattern.

14. A data reading device as defined in claim 13, wherein the period of time for the application of the current to said code pattern is predetermined.

15. A data reading device as defined in claim 13, wherein said discriminating means includes means for applying a current smaller than said comparatively large current to said code pattern; and said reading means includes means for detecting the voltage potential at said predetermined regions of said code regions, the voltage potentials representing the determination result.

16. A data reading device as defined in claim 1, wherein said causing means causes said reading operations before an exposure calculation by said camera so that said data being accurate with a high probability produced by said data producing means can be used for the exposure calculation.

17. A data reading device for a camera which is adapted to be loaded with a film cartridge having a code pattern whose code regions are selectively conductive and nonconductive with a common region thereof in accordance with the data on the film contained in said film cartridge, said data reading device comprising:

(a) means for determining whether predetermined regions of said code regions are conductive or nonconductive with said common region;

(b) means for reading the determined result to produce data in accordance therewith;

(c) means for causing said reading means to perform the reading operation;

(d) means for applying a comparatively large current to said code pattern on said film cartridge before the start of the reading operation by said reading means for the purpose of increasing the resistance values of the nonconductive code regions of said code pattern even with a wet code pattern.

18. A data reading device as defined in claim 17, wherein said discriminating means includes means for applying to said code pattern a current smaller than said comparatively large current, and said reading means includes means for detecting the voltage potentials at said predetermined regions of said code regions, the voltage potentials representing said determined result.

19. A data reading device as defined in claim 17, wherein the period of time for the application of said current to said code pattern is predetermined.

* * * * *